United States Patent
Iannotti et al.

(10) Patent No.: US 10,784,576 B2
(45) Date of Patent: Sep. 22, 2020

(54) TRUE TIME DELAY BEAM FORMER MODULE AND METHOD OF MAKING THE SAME

(71) Applicant: General Electric Company, Schenectady, NY (US)

(72) Inventors: Joseph Alfred Iannotti, Glenville, NY (US); Christopher James Kapusta, Delanson, NY (US)

(73) Assignee: General Electric Company, Schenectady, NY (US)

( * ) Notice: Subject to any disclaimer, the term of this patent is extended or adjusted under 35 U.S.C. 154(b) by 314 days.

(21) Appl. No.: 15/782,991

(22) Filed: Oct. 13, 2017

(65) Prior Publication Data

US 2019/0115658 A1    Apr. 18, 2019

(51) Int. Cl.
| | | |
|---|---|---|
| *H01Q 3/26* | (2006.01) | |
| *H01P 9/00* | (2006.01) | |
| *H01Q 21/00* | (2006.01) | |
| *H01Q 21/06* | (2006.01) | |

(52) U.S. Cl.
CPC ........... *H01Q 3/2682* (2013.01); *H01P 9/006* (2013.01); *H01Q 21/0025* (2013.01); *H01Q 21/0075* (2013.01); *H01Q 21/065* (2013.01)

(58) Field of Classification Search
None
See application file for complete search history.

(56) References Cited

U.S. PATENT DOCUMENTS

| | | |
|---|---|---|
| 5,757,319 A | 5/1998 | Loo et al. |
| 6,307,519 B1 | 10/2001 | Livingston et al. |
| 6,650,291 B1 | 11/2003 | West et al. |
| 7,570,133 B1 | 8/2009 | Taft et al. |
| 9,735,469 B1 | 8/2017 | West et al. |
| 10,283,876 B1 * | 5/2019 | Livadaru ............... H01Q 21/245 |
| 2002/0075094 A1 | 6/2002 | Bechtle et al. |

(Continued)

FOREIGN PATENT DOCUMENTS

WO    2014142885 A1    9/2014

OTHER PUBLICATIONS

International Search Report and Written Opinion issued in connection with corresponding PCT Application No. PCT/US2018/047167 dated Dec. 5, 2018.

(Continued)

*Primary Examiner* — Whitney Moore
(74) *Attorney, Agent, or Firm* — Ziolkowski Patent Solutions Group, SC; Jean K. Testa

(57) ABSTRACT

A beam former module includes a package base and an interconnect structure formed within the package base. The beam former module also includes a first true time delay (TTD) module attached to the package base. The first TTD module includes a plurality of switching elements configured to define a signal transmission path between a signal input and a signal output of the first TTD module by selectively activating a plurality of time delay lines. The signal input and the signal output of the first TTD module are electrically coupled to the interconnect structure. In some embodiments, the interconnect structure includes at least one TTD meander line and at least one of the time delay lines of the first TTD module is electrically coupled to the at least one TTD meander line.

25 Claims, 6 Drawing Sheets

(56) References Cited

U.S. PATENT DOCUMENTS

| | | |
|---|---|---|
| 2002/0167443 A1 | 11/2002 | McKinzie, III et al. |
| 2003/0043071 A1 | 3/2003 | Lilly et al. |
| 2004/0246073 A1 | 12/2004 | Zhou |
| 2005/0068123 A1 | 3/2005 | Denatale et al. |
| 2007/0154220 A1 | 7/2007 | Stephens |
| 2009/0027268 A1 | 1/2009 | Coward |
| 2011/0122026 A1 | 5/2011 | DeLaquil et al. |
| 2016/0006241 A1 | 1/2016 | Fitzgerald et al. |
| 2017/0062926 A1 | 3/2017 | Bonebright et al. |

OTHER PUBLICATIONS

Jianqiang et al., "Research on Improving Lateral Resolution of Ultrasound Phases Array Elements by Using Sparse Matrix," Applied Mechanics and Materials, 2013 Trans Tech Publications, Switzerland, ISSN: 1662-7482, vols. 380-384, pp. 3409-3412.

Li et al., "The Design of Sparse Antenna Array," Institute of Electronics, Chiense Academics of Sciences, Beijing, China, 2008, pp. 1-3.

Bencivenni, "Sparse Array Synthesis of Complex Antenna Elements," Thesis, Department of Signals and Systems, Antenna Systems Division, Chalmers University of Technology, Goteborg, Sweden, 2015, pp. i-52.

Collins, II, "Optimization of the Antenna Pattern of a Phases Array With Failed Elements," Thesis, Department of the Air Force, Air University, Air Force Institute of Technology, Wright-Patterson Air Force Base, Ohio, Dec. 1986, pp. i-77.

Schaffner et al., "A Wideband Beam Switching Antenna Using RF MEMS Switches", IEEE Antennas and Propagation Society International Symposium, Jul. 8-13, 2001, pp. 658-661.

Shin et al., "Optical True Time-Delay Feeder for X-band Phased Array Antennas Composed of 2×2 Optical MEMS Switches and Fiber Delay Lines", IEEE Photonics Technology Letters, vol. 16, No. 5, May 2004, pp. 1364-1366.

Liang et al., "MEMS Based True Time Delay Technology for Phased Antenna Array Systems", Proceedings of Asia-Pacific Microwave Conference 2007, Dec. 1-14, 2007, pp. 1-4.

Dey et al., "Reliability Analysis of Ku-Band 5-bit Phase Shifters Using MEMS SP4T and SPDT Switches", IEEE Transactions on Microwave Theory and Techniques, vol. 63, No. 12, Dec. 2015, pp. 3997-4012.

\* cited by examiner

TRUE TIME DELAY BEAM FORMER MODULE AND METHOD OF MAKING THE SAME

BACKGROUND OF THE INVENTION

Embodiments of the invention relate generally to true time delay (TTD) beam formers for an electrically steerable array antenna or phased array antenna, and more particularly to multi-function TTD beam formers having multiple TTD modules integrated into one assembly with time delay lines for the TTD modules formed in the assembly packaging.

Electronically steered antenna (ESA) systems or phased array antenna (PAA) systems combine the signals from multiple stationary antenna elements to point a beam of radio waves at a certain angle in space. The characteristics and angle of the beam is controlled in a manner that electronically steers the beam in different directions without physically moving the antennas. The electronic beam steering in a phased array antenna is often accomplished in one of two ways: through the use of phase shifters or true time delay devices. TTD beam steering differs from a phase shifter type approach in the inherent bandwidth of the device and the fact that the device imparts a time delay rather than a phase shift. These distinctions allow the TTD device to be used in very wideband applications for forming antenna beams and nulls. This is advantageous for electronic warfare systems and broadband communication applications.

Beam steering via TTD is accomplished by changing the excitation time of each antenna element through the use of a TTD module. The TTD module is fabricated with high speed switches coupled to time delay lines of various lengths. The excitation time of a particular antenna element is controlled by selecting a particular combination of time delay lines within the TTD module, which imparts a desired amount of time delay on the radio frequency (RF) signal. Selection of the time delay lines may be accomplished using different types of switching elements such as RF microelectromechanical systems (MEMS) switches, which provide beneficial isolation and insertion loss properties that are advantageous for implementing in TTD applications. These RF MEMS switches use an electrically actuated mechanical movement to achieve an open circuit or a closed circuit in an RF time delay line. When the RF MEMS device is in an on position, the RF transmission line is "closed" and in the RF signal path. When the RF MEMS device is in an off position, the RF transmission line is "open," and isolated from the RF signal path.

In general, the RF MEMS switches described above provide several benefits such as, for example, low insertion loss, low return loss, and high isolation for high frequency RF signals. However, RF MEMS switches need to be packaged in a clean controlled environment to enable long and repeatable operation. Thus, RF MEMS switches are typically hermetically sealed in a cavity formed within a substrate of glass, metal, or ceramic materials. Interconnections are then made through the sealed RF MEMS switch cavity to the next level assembly such as, for example, a printed circuit board (PCB). These interconnections, which may be made using through quartz via (TQV) technology or similar, increase fabrication costs and negatively impact yield. Also, the long path lengths of these interconnections become highly problematic if one is trying maintain low RF loss and highly reproducible parasitics, especially when using RF MEMS switches at higher RF frequencies (for example, X band from 8 GHz to 12 GHz, Ku Band from 12 GHz to 18 Ghz, and millimeter wave from 30 GHz to 300 GHz).

One approach to decreasing the RF loss associated with the RF MEMS switch interconnections is to use a monolithic TTD device. In a monolithic TTD device, all of the TTD transmission paths are included on the same base substrate as the RF MEMS switches. While the monolithic TTD device construction mitigates the problems associated with input/output routing on and off the packaged TTD device, it drastically increases the overall size and therefore cost of the base RF MEMS switch substrate, especially if the packaged device is designed for use at lower frequencies. Prior art monolithic TTD devices are individually packaged structures that include a cap or lid that is positioned above the base substrate and encloses the RF MEMS switches within a vacuum or hermetically sealed cavity. This lid structure also increases the overall size and cost of the TTD device. Thus, a monolithic TTD device has its own significant drawbacks.

In addition to the above-described component level problems associated with TTD devices or modules, TTD beam forming systems face a number of system level problems. Because each antenna element is connected to a separate TTD module, the overall system includes a large number of connections, especially for systems with thousands of antenna elements. Therefore, installation of the TTD beam forming system is time intensive and expensive when accounting for the cost of each connection element. Further, the electrical connection between the antenna elements, TTD modules, and other electronic control components of the system are typically made using coaxial cable, which leads to significant calibration issues as the length of each coaxial cable and any bends therein will impart a time delay that impacts signal transmission between the TTD modules and the antenna elements.

Therefore, it would be desirable to design a TTD beam former that addresses both the system level and component level drawbacks of known TTD beam forming systems. At the component level, it would be desirable to design a TTD module that permits formation of longer transmission paths while maintaining low RF losses and minimizing the size of the base substrate. At the system level, it would also be desirable to connect the TTD modules and antenna elements of the TTD beam former in a reproducible manner that reduces variability in performance, cost, and calibration time.

BRIEF DESCRIPTION OF THE INVENTION

In accordance with one aspect of the invention, a beam former module includes a package base and at least one TTD meander line and at least one RF signal transmission line encapsulated in the package base. In addition, the beam former module includes a first TTD module attached to the package base. The first TTD module includes a plurality of switching elements configured to define a signal transmission path between a signal input and a signal output of the first TTD module by selectively activating a plurality of time delay lines. At least one of the time delay lines of the first TTD module is electrically coupled to the at least one TTD meander line encapsulated in the package base. The signal input and the signal output of the first TTD module are electrically coupled to the at least one RF signal transmission line.

In accordance with another aspect of the invention, a method of manufacturing a beam former module includes encapsulating at least one time delay line and at least one RF signal transmission line in a package body and disposing at least one TTD module on a surface of the package body. The method also includes electrically coupling at least one time delay line in the at least one TTD module to the at least one time delay line in the package body and electrically coupling a signal input and a signal output of the at least one TTD to the at least one RF signal transmission line.

In accordance with yet another aspect of the invention, a TTD module includes an RF signal input, an RF signal output, a transmission line comprising a plurality of time delay lines defining signal paths of varying lengths, and a plurality of switching elements controllable to selectively activate the plurality of time delay lines to define a signal transmission path between the RF signal input and the RF signal output. The plurality of time delay lines includes at least one off-chip time delay line. The off-chip time delay line includes a first on-chip portion coupled between a first switching element of the plurality of switching elements and a first bond pad and a second on-chip portion coupled between a second switching element of the plurality of switching elements and a second bond pad.

In accordance with still another aspect of the invention, a TTD beam former module includes a package base having a plurality of insulating layers and an interconnect structure formed between and through the plurality of insulating layers. The TTD beam former module further includes a lid sealed to the package base and at least one TTD module positioned within a hermetic cavity formed between the lid and the package base and electrically coupled to the interconnect structure. Each TTD module includes a plurality of switches configured to selectively active a signal transmission line between a signal input of the TTD module and a signal output of the TTD module. The TTD beam former module additionally includes at least one antenna element attached to an outer layer of the package base. Each antenna element is electrically coupled to a respective TTD module of the at least one TTD module via the interconnect structure.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings.

DETAILED DESCRIPTION

Embodiments of the invention provide a system for forming or receiving a beam in an application such as a PAA system or an ESA system. The beam forming system includes a plurality of beam former modules or "bricks" that can be coupled together in a modular fashion to create an overall system with a desired number of antenna elements for the particular application. Each beam former module includes a multi-layer package base and a number of components integrated into the package base including antenna elements, a signal combiner/splitter, and voltage, ground, and control logic lines. TTD module(s) and the respective amplifier(s) that electrically couple each TTD module to a respective antenna element are hermetically sealed within a cavity formed within the package base. Switching elements on each TTD module are controlled by a control system to selectively activate time delay lines and create a signal transmission path between an RF input and an RF output of the TTD module. In some embodiments, all of the time delay lines are located on-chip, meaning that they are fabricated on the base substrate of the TTD module itself. In other embodiments, a portion of the TTD module's longer time delay lines extend off-chip and into the multi-layer structure of the package base.

Figure 1:
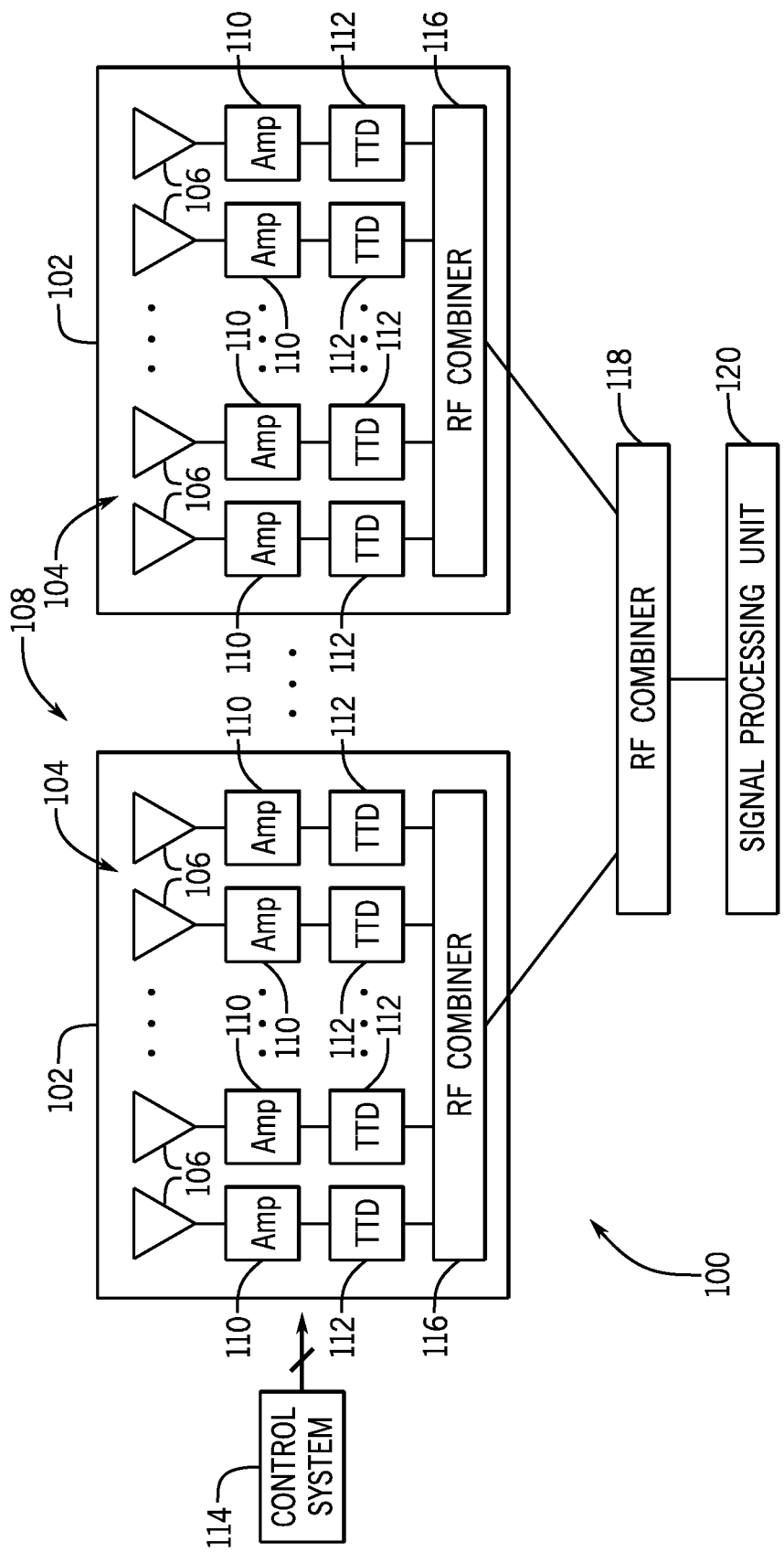
FIG. 1 is a simplified schematic diagram of an analog beam forming system having multiple beam former modules, according to an embodiment of the invention.

Referring first to FIG. 1, a simplified schematic diagram of an analog antenna or beam forming system 100 is illustrated according to an embodiment of the invention. Beam forming system 100 is shown as a receiver, but may be designed as a transmitter or have receiving and transmitting functionality in other embodiments. Beam forming system 100 includes a plurality of beam former modules or bricks 102. While only two beam former modules 102 are shown, beam forming system 100 could include any number of beam former modules 102. Each beam former module 102 includes an antenna 104 constructed of multiple radiating elements or patches 106 for receiving RF signals. Together antennas 104 of the plurality of beam former modules 102 form an antenna array 108.

Antenna elements 106 feed received RF signals to amplifiers 110, which amplify the respective RF signals before relaying them to a respective TTD module 112. In this case, amplifiers 110 are typically low noise amplifiers (LNAs), however may be otherwise configured in alternative embodiments. A control system 114 provides signals to selectively control switching elements within TTD modules 112 in a manner that generates a time delay signal. Control system 114 may be in the form of a single controller or may include multiple controllers or processors that control the various components of beam former modules 102.

Each TTD die 112 relays a respective time delay signal to a respective module RF combiner 116, each of which combines each received time delay signal and outputs a module RF signal to a system RF combiner 118 exterior to beam former modules 102. In one non-limiting embodiment, RF combiners 116, 118 are Wilkinson RF power combiners. System RF combiner 118 combines each received module RF signal and outputs a system RF signal to a signal processing unit 120. Signal processing unit 120 includes a local oscillator (LO) and mixer, an analog-to-digital (A/D) converter, and a digital signal processor (DSP) for processing the system RF signal received from system RF combiner 118. The feed structure of beam forming system 100, as described above, is commonly known as a corporal feed structure.

Figure 2:
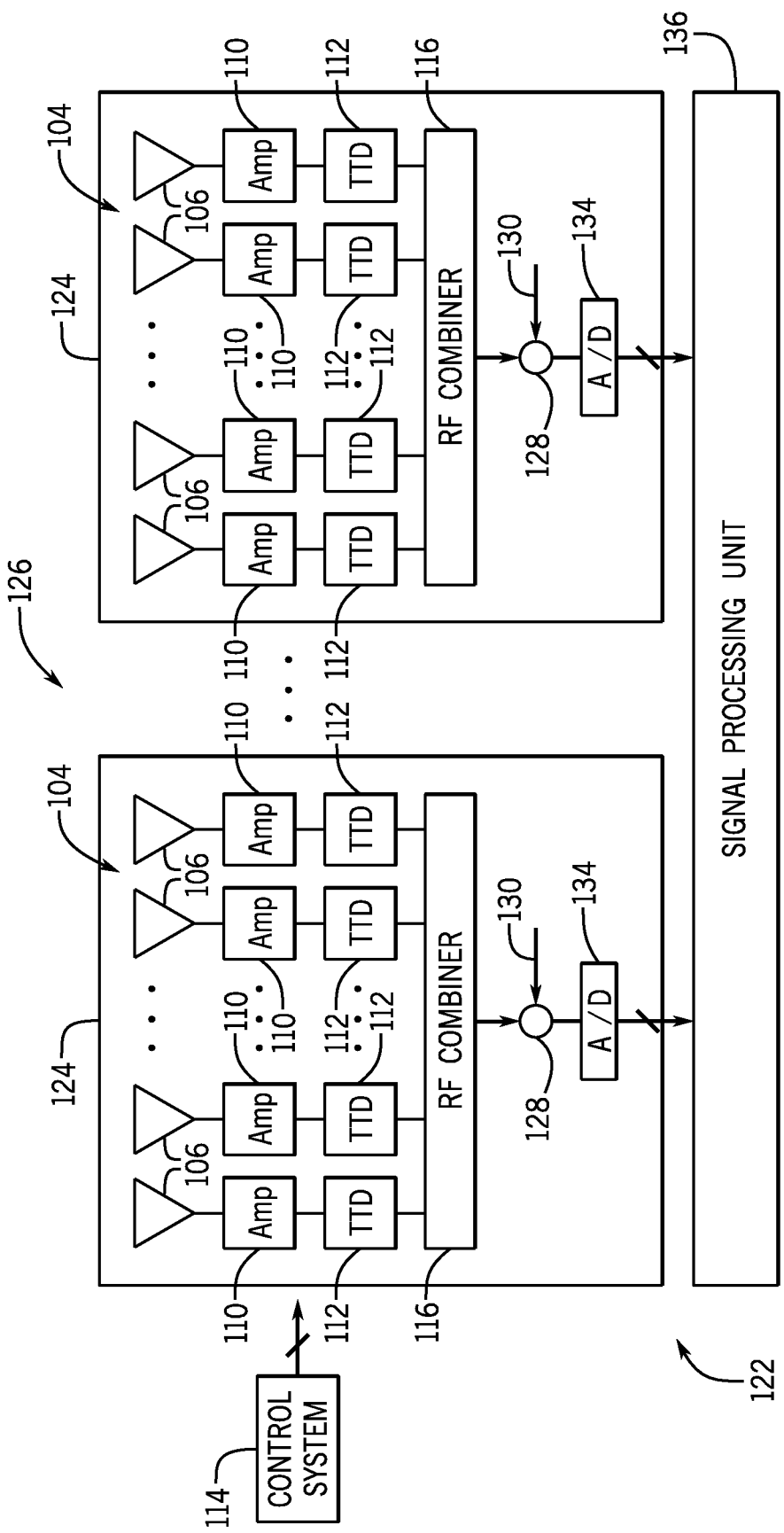
FIG. 2 is a simplified schematic diagram of a digital beam forming system having multiple beam former modules, according to an embodiment of the invention.

While FIG. 1 depicts an analog beam forming system, alternative embodiments of the invention are directed to a digital system such as the digital antenna or beam forming system 122 illustrated in FIG. 2. Beam forming system 122 is shown as a receiver, but may be designed as a transmitter or have receiving and transmitting functionality in other embodiments. Similar to analog beam forming system 100 of FIG. 1, digital beam forming system 122 includes a plurality of beam former modules or bricks 124. While only two beam former modules 124 are shown, beam forming system 122 could include any number of beam former modules 124.

In a similar manner to beam former modules 102 of beam forming system 100 (FIG. 1), each beam former module 124 includes an antenna 104 constructed of multiple radiating elements 106 for receiving RF signals. Together antennas 104 of the plurality of beam former modules 102 form an antenna array 126. Antenna elements 106 feed received RF signals to LNAs 110, which amplify the respective RF signals before relaying them to a respective TTD module 112. A control system 114 provides signals to selectively control switching elements within TTD modules 112 in a manner that generates a time delay signal. As in beam forming system 100, control system 114 of beam forming system 122 may be in the form of a single controller or may include multiple controllers or processors that control the various components of beam former modules 124. Each TTD die 112 relays a respective time delay signal to a respective module RF combiner 116.

Each RF combiner 116 combines each time delay signal received and outputs a combined RF signal to a mixer 128. Each mixer 128 receives an input signal 130 from an LO (not shown) for down converting the combined RF signal. Mixers 128 then output respective down converted RF signal to a respective A/D converter 134. Each A/D converter 134 converts the down converted RF signal into a digital signal with a predetermined number of bits such as, for example, 32 bits. The digital signal is then input into a signal processing unit 136. According to various embodiments, signal processing unit 136 may be provided in the form of a field-programmable gate array (FPGA) or a graphics processing unit (GPU) or another processing unit capable of carrying out the high degree processing power associated with operating digital beam forming system 122.

While not specifically illustrated in FIGS. 1-2, it is contemplated that embodiments of the invention may be configured for independent beam control of the vertical and horizontal polarizations and include separate beam controlling circuitry for each polarization. In that case, each antenna element 106 would includes two pairs of amplifiers 110 and TTD modules 112: a first amplifier 110 and TTD module 112 pair for the vertical polarization and a second amplifier 110 and TTD module 112 pair for the horizontal polarization. Alternatively, embodiments may be configured for circular polarization. In addition, while FIGS. 1-2 show four antenna elements 106 and four corresponding TTD modules 112 in each beam former module 102 (FIG. 1) and each beam former module 124 (FIG. 2), it is contemplated that antennas 104 may include less or more antenna elements 106 and corresponding TTD modules 112. In one non-limiting embodiment, each beam former module 102 or beam former module 124 includes 16 antenna elements 106 and corresponding TTD modules 112. It is also contemplated that antenna array 108 (FIG. 1) and antenna array 126 (FIG. 2) may include hundreds or thousands of antenna elements 106 and corresponding TTD modules 112 so as to enable the use of complex RF feeding schemes.

Figure 3:
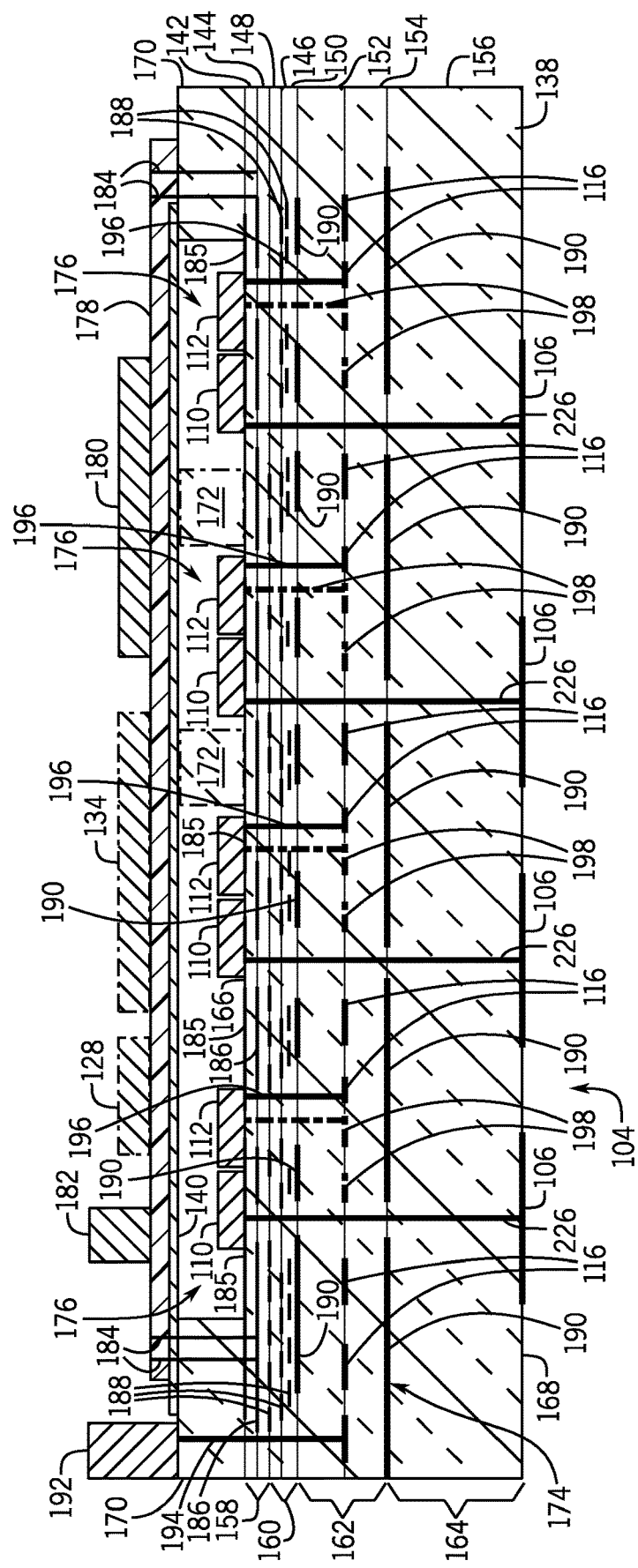
FIG. 3 is a beam former module, according to one embodiment of the invention.

FIG. 3 is a cross sectional view of a beam former module 125, according to an embodiment of the invention. Like beam former modules 102 and 124 of FIGS. 1 and 2, beam former module 125 is shown as a receiver, but may be designed as a transmitter in alternative embodiments. Beam former module 125 includes a package base or body 138 and a lid 140 sealed to package base 138. Package base 138 is generally formed of an inorganic material conducive to a hermetic seal such as, for example, glass, ceramic, or a combination thereof. In the exemplary configuration depicted in FIG. 3, package base 138 includes eight insulating layers 142-156 divided into four regions 158-164 between an interior or inner surface 166 and an exterior or outer surface 168 including a power and ground region 158, a control logic region 160, an RF combiner region 162, and an RF patch array region 164. However, one skilled in the art will recognize that beam former module 125 may be fabricated having more or less interconnect layers based on the desired interconnect routing pattern of a particular application.

A wall 170 extends upward from interior surface 166 and provides a sealing surface for lid 140. Optionally, package base 138 may include one or more standoff posts or spacers 172 (shown in phantom) positioned between interior or inner layer 142 and lid 140 to limit lid deflection. In some embodiments lid 140 is bonded to walls 170 and optional standoff posts 172 of package base 138 with an intervening layer of sealing material (not shown) such as, for example, solder, glass frit, or gold to form a hermetic cavity 176 housing LNAs 110 and TTD modules 112. Lid 140 may be formed of Kovar® or any other material that forms a reliable seal with package body 138.

LNAs 110 and TTD modules 112 are electrically coupled to the interior layer 142 of package body 138 via flip-chip attach, wire bonds, or another known attachment technique. TTD modules 112 from spaced apart from each other to provide desired RF isolation. In some embodiments, optional standoff posts 172 may be constructed to create multiple, individual hermetic cavities 176 and provide improved RF isolation between TTD modules 112.

Beam former module 125 further includes a high density interconnect (HDI) circuit 178 coupled to lid 140 and portions of wall 170 in some embodiments. A controller 180 and a digital I/O and power block 182 are attached to HDI circuit 178. An optional mixer 128 and optional A/D converter 134 (both shown in phantom) are coupled to HDI circuit 178 in embodiments where beam former module 125 is configured for use in a digital beam forming system, such as system 122 (FIG. 2). HDI circuit 178 includes a multi-layer interconnect structure (not shown) with a fine pitch resolution connecting the digital components of mixer 128, A/D converter 134, controller 180, and I/O and power block 182 to signal lines 184 extending from HDI circuit 178 through lid 140 and/or package base 138. In various embodiments, controller 180 is an application-specific integrated circuit (ASIC), and HDI circuit 178 is a multilayer prefabricated HDI flex circuit for ASIC fanout. Signal lines 184 include a plurality of electrical paths that enable connection between components embedded within package base 138 and located in hermetic cavity 176. While only four signal lines 184 are shown, signal lines 184 may include any number of transmission paths to form desired connections to elements within beam former module 125.

An electrically conductive interconnect structure 174 is formed between and through insulating layers 142-156 to provide electrical paths between the various electrical components coupled to and embedded within package body 138, as described in more detail below. One skilled in the art will recognize that FIG. 3 illustrates only one exemplary arrangement of interconnect structure 174 and that each electrical line of interconnect structure 174 represents one or multiple electrical lines between devices. Insulating layers 142-156 and the interconnect structure 174 may be formed using any known lamination, deposition, patterning, and/or etching techniques to create electrical connections between the various electrical components of beam former module 125. In one embodiment the electrically conductive interconnect structure 174 is in the form of a low profile, planar interconnect structure that provides for formation of an input/output (I/O) system.

Layers of power and ground signal lines 185, 186 are formed within power and ground region 158 of package 138, which includes insulating layers 142, 144. Power and ground lines 185, 186 are coupled to components of beam former module 125, such as, for example, HDI circuit 178 and I/O and power block 182, to provide power throughout beam former module 125 and to form ground connections. Control logic signal lines 188 are patterned within control logic region 160 of package base 138, which includes insulating layers 146, 148, 150. Control logic signal lines 188 are coupled to controller 180 via signal lines 184 and are used to control TTD modules 112.

RF combiner region 162 of package base 138 may include a single insulating layer or two or more insulating layers 152, 154, as shown in FIG. 3, in various alternative embodiments. Regardless of how many insulating layers are included in RF combiner region 162, stripline RF combiner 116 is encapsulated within region 162. As shown, RF combiner 116 is implemented as a passive RF combining structure. RF combiner 116 is coupled to an input/output block 192 via a transmission line 194, and the input of RF combiner 116 is coupled to each TTD module 112 via transmission lines 196. In digital system embodiments, input/output block 192 functions as a local oscillator input and is electrically coupled with a mixer 128 (FIGS. 2-3). Thus, when TTD modules 112 output a time delay signal to RF combiner 116, RF combiner 116 combines the time delay signals and outputs a combined RF signal to input/output block 192, which outputs the combined RF signal to a mixer such as mixer 128 of FIG. 2. In embodiments where beam former module 125 is fabricated for use in an analog system, input/output block 192 outputs an RF signal to a signal processing unit (e.g., element 120 of FIG. 1).

RF path array region 164 includes antenna elements 106 embedded in exterior surface 168 of outer layer 156 of package base 138. Antenna elements 106 are coupled to LNAs 110 attached to interior surface 166 of package base 138 via transmission lines 226, which are encapsulated in each region 158-164. Exterior layer 156 of RF path array region 164 is generally the thickest region of package base 138 to provide isolation for antenna elements 106. As a non-limiting example, if layers 142-150 are approximately 2 mils and layers 152-154 are approximately 10 mils, layer 156 may be approximately 30 mils. In one embodiment, exterior layer 156 is formed of ceramic.

Figure 4:
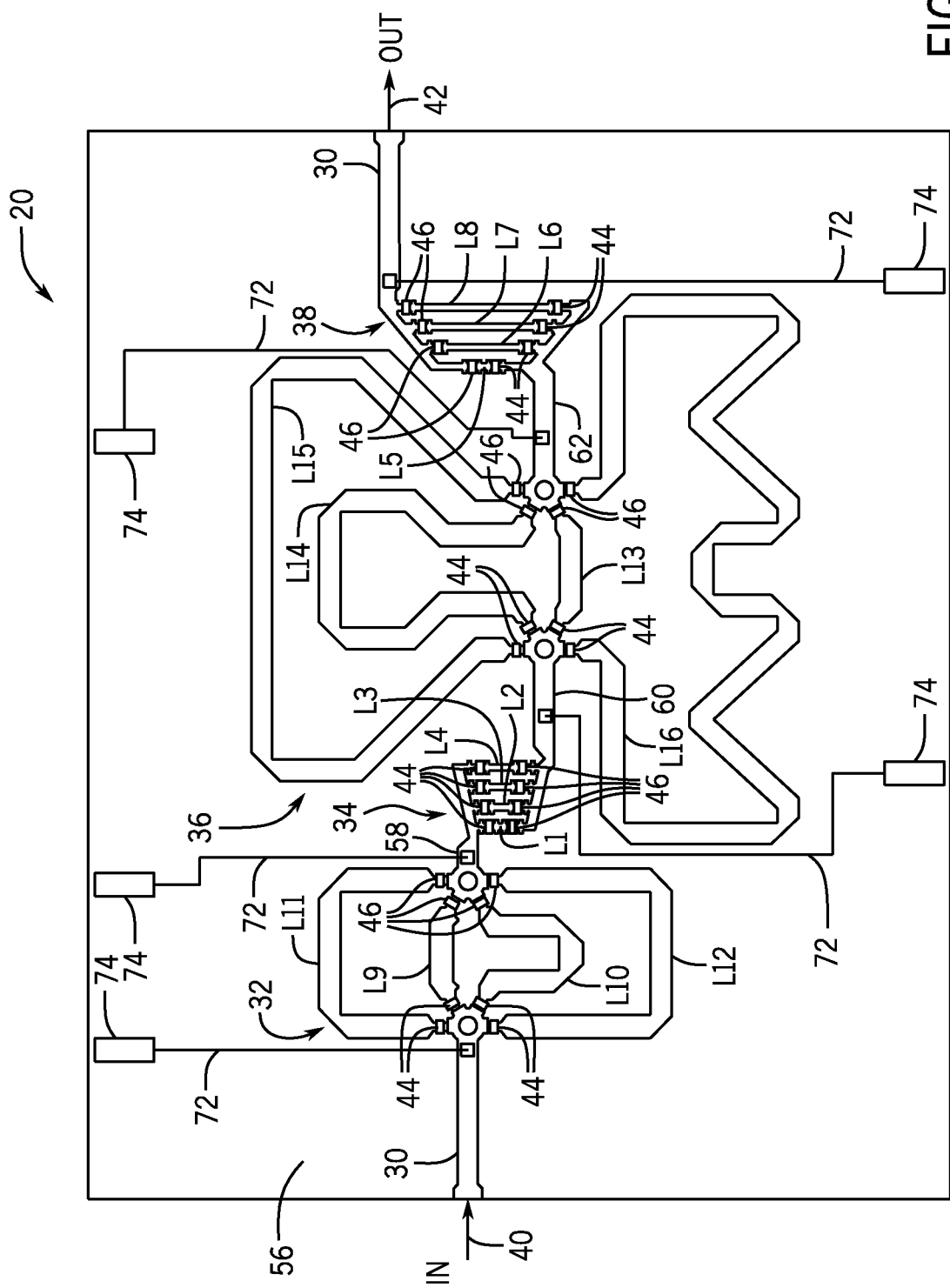
FIG. 4 is a schematic top view of a TTD module that is usable in the beam former module of FIG. 3, according to an embodiment of the invention.

Transmission lines 196 provide transmission paths for the input and output signals of TTD modules 112, which may be configured as monolithic devices such as the exemplary TTD module 20 shown in FIG. 4, meaning that the entire micro-strip transmission line or signal line 30 is patterned on a common base substrate 56. This base substrate 56 is then coupled to the interior surface 166 of package base 138 (FIG. 3). In alternative embodiments, such as, for example, embodiments where interior surface 166 is fused silica or glass, all or portions of transmission line 30 and all or portions of the switching elements 44, 46 of the TTD module 20 may be formed or patterned directly onto interior surface 166 of package base 138 (FIG. 3). In the illustrated embodiment, micro-strip transmission line 30 is patterned to include four (4) serially connected sets of time delay stages 32, 34, 36, 38, with first delay stage 32 coupled to a radio frequency (RF) signal input 40 of TTD module 20 and fourth delay stage 38 coupled to an RF signal output 42 of TTD module 20. Each of delay stages 32, 34, 36, 38 includes an input electronic switching element 44 and an output electronic switching element 46 that are selectively controlled in either their on or off positions to insert a cumulative time delay in a transmission signal sent to a respective antenna element (not shown). While TTD module 20 is designed as a 256 state beam former with four (4) delay stages and a 360 degree delay/phase-shift range, it is that the concepts disclosed herein may be extended to TTD modules having any number of delay stages and alternative delay line configurations.

First delay stage 32 includes four micro-strip time delay lines L9-L12 patterned on base substrate 56 of TTD module 20. The delay lines within each delay stage have different lengths that impart different time delays to RF input signal 40. The phase of the transmission signal is shifted in proportion to the time delay imparted by the respective delay lines. Second, third, and fourth delay stages 34, 36, 38 are formed in a similar manner as first delay stage 32, with delay stage 34 including micro-strip time delay lines L1-L4, delay stage 36 including micro-strip time delay lines L13-L16, and delay stage 38 including micro-strip time delay lines L5-L8 of varying lengths patterned on base substrate 56. Line segments 58, 60, 62 interconnect delay stages 32-38. Additional phase shift is imparted to RF input signal 40 by each subsequent delay stage 34-38 by selectively closing a given pair of switches 44, 46 on one of the four micro-strip delay lines while the remaining pairs of switches 44, 46 are maintained in an open position in a similar manner as described above.

Switching devices 44, 46 are positioned on base substrate 56 at the terminal input and terminal output, respectively, of each micro-strip delay line L1-L16 and are controlled in pairs to activate a respective micro-strip delay line L1-L16. In TTD module 20, switching devices 44, 46 are RF MEMS switches. These RF MEMS switches 44, 46 use an electrically actuated mechanical movement to achieve an open circuit or a closed circuit in transmission line 30. When a given pair of RF MEMS devices 44, 46 in each delay stage 34-38 is in an on position, transmission line 30 is "closed." When all of the RF MEMS devices 44, 46 are in an off position, transmission line 30 is "open," and RF MEMS devices 44, 46 prevent the RF signal from reaching RF output 42 of TTD module 20.

RF MEMS switches 44, 46 are controlled to open and close by applying a selective gate voltage thereto. This gate voltage is provided through gating lines 72 patterned on base substrate 56. Gating lines 72 electrically couple MEMS switches 44, 46 to gate voltage sources or gate drivers 74. Thus, the amount of time it takes for a signal to be transmitted through TTD module 20 to an antenna (not shown) is controlled by opening and closing combinations of RF MEMS switches 44, 46 using gate drivers 74 to active different time delay lines L1-L16 and impart a desired amount of phase or time delay on an RF signal.

While the TTD modules 112 of FIG. 4 are described as monolithic devices, TTD modules 112 differ from prior art monolithic TTD modules because they do not include device-level caps or lids. When packaged within the beam former module 125 (FIG. 3), these lidless TTD modules 112 are positioned within the hermetically sealed cavity 176 formed between the package body 138 and the package lid 140.

Figure 5:
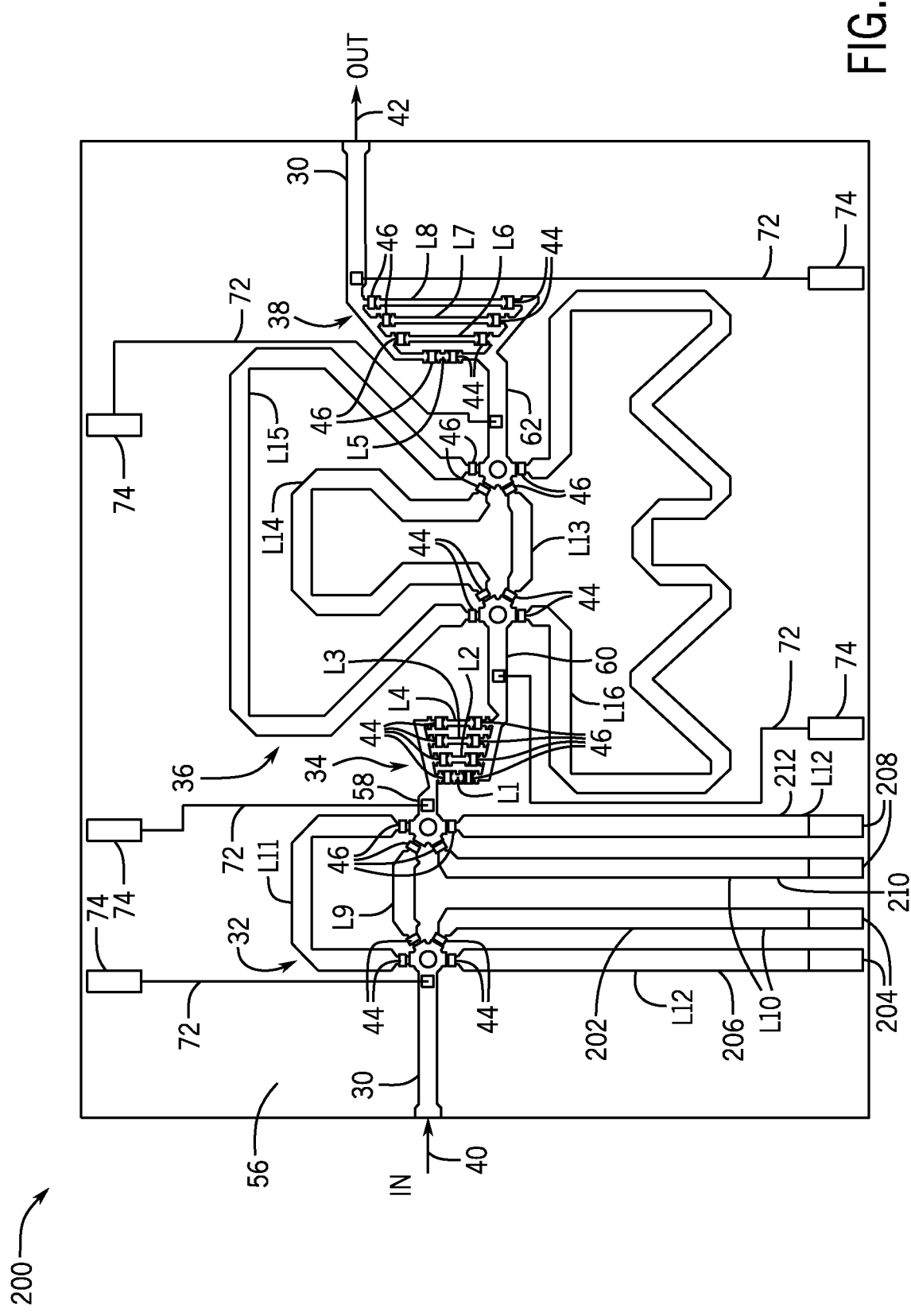
FIG. 5 is a schematic top view of a monolithic TTD module having off-chip time delay lines that is usable in the beam former module of FIG. 3, according to an embodiment of the invention.

In alternative embodiments of the invention, the beam former module 125 of FIG. 3 also includes optional TTD meander lines 198, which couple with select delay lines of a TTD module with off-chip delay line connections such as TTD module 200 of FIG. 5. Similar to transmission lines 196, TTD meander lines 198 are patterned on an upper surface of insulating layer 154 and are coupled to the upper conductive layer 185 through conductive vias formed through select insulating layers 142-152. Referring now to FIG. 5, TTD module 200 shares a number of similar components as TTD module 20 (FIG. 4), which are referred to with common part numbers as appropriate. TTD module 200 differs from TTD module 20 in that one or more time delay lines L10, L12 are constructed in a manner that enables off-chip connection with one or more TTD meander lines 198. While two delay lines L10, L12 are illustrated in FIG. 5 as being configured for off-chip connection, it is contemplated that alternative embodiments any number of the time delay lines of a particular TTD module may be configured in a similar fashion as long as the overall length of each time delay line is defined in a manner that maintains signal continuity between time states.

As illustrated in FIG. 5, time delay lines L10, L12 of delay stage 32 differ from time delay lines L1-L9, L11, L13-L16 in that they are constructed in two sections, with each on-chip section 202, 206, 210, 212 extending between a switching element 44, 46 and a bond pad 204, 208 formed on the base substrate 56. More specifically, a first on-chip section 202 of time delay line L10 extends from its respective switch 44 to bond pad 204, while a second on-chip portion 210 of time delay line L10 is connected between switch 46 and a bond pad 208. First and second on-chip sections 206, 212 of time delay line L12 likewise extend from its corresponding switches 44, 46 to respective bond pads 204, 208.

Bond pads 204 function as connection points for electrically coupling first on-chip sections 202, 206 of respective time delay lines L10, L12 to input ends of respective TTD meander lines 198 (FIG. 3) embedded in package base 138 of beam former module 125. Bond pads 208 electrically couple the second on-chip sections 210, 212 of time delay lines L10 and L12 to the output ends of the corresponding TTD meander lines 198. The connection between bond pads 204, 208 and TTD meander lines 198 are generally made through flip-chip solder connections made on interior surface 166 of package base 138, although other types of connections may be used.

The time delay associated with each time delay line L10, L12 is defined based on the combined length of its respective first on-chip sections 202, 206 and respective second on-chip sections 210, 212 and the TTD meander line 198 that those first and second on-chip sections 202, 206, 210, 212 are coupled to. Thus, the two TTD meander lines 198 connected to input feed paths 204 function as off-chip sections of time delay lines L10, L12. Thus, when time delay line L10 is activated by its corresponding switch pairs 44, 46, a signal input into TTD module 200 will travel through first on-chip section 202 and into the corresponding bond pad 204. The signal will then flow through the off-chip section provided by a TTD meander line 198 located in package base 138 and back to TTD module 200 at the corresponding bond pad 208. Afterward, the signal will pass through second on-chip section 210 of time delay line L10. A signal input into TTD modules 200 would flow through time delay line L12 in a similar manner when activated.

By locating TTD meander lines 198 in package base 138, select delay lines of the TTD module 200 may be fabricated having an associated time delay that is longer than the time delay lines on TTD modules 200 themselves. For example, in a non-limiting embodiment, on-chip time delay lines on TTD modules 200 may range from 0-degree lines to 48 degrees lines, but off-chip TTD meander lines may include 64-degree, 128-degree, and even 192-degree lines. In the example, the number of degrees associated with each line corresponds to the amount of time delay added to the time delay signal when activated. Thus, TTD meander lines 198 may be significantly longer than on-chip time delay lines.

The off-chip portions of time delay lines L10, L12 included in package base 138 of beam former 124 allow TTD module 200 to utilize longer time delay lines without connecting to a higher level assembly and without being formed as a monolithic TTD module. Thus, TTD module 200 can be designed with long time delay lines for use with lower frequency applications without increasing the overall size, and therefore cost, of the base substrate 56 of TTD module 200 or significantly increasing RF losses by connecting to higher level assemblies.

In order to further minimize RF losses within the beam former module 125, insulating layers 152, 154 of RF combiner region 162 may be formed thicker than layers 142-150 of power and ground region 158 and control logic region 160 as shown in FIG. 3. The thickness of layers 152, 154 are chosen to mitigate RF losses in TTD meander lines 198. In one non-limiting embodiment, each of layers 142-150 are approximately 2 mils thick and each of layers 152, 154 are approximately 10 mils thick. Layers 152, 154 may also be formed of a low loss insulating material, such as, for example ceramic, while layers 142-150 may be formed of another material such as, for example, glass. In addition, TTD meander lines 198 are arranged within layers 152-154 such that no signal line crosses another to further mitigate RF losses.

Figure 6:
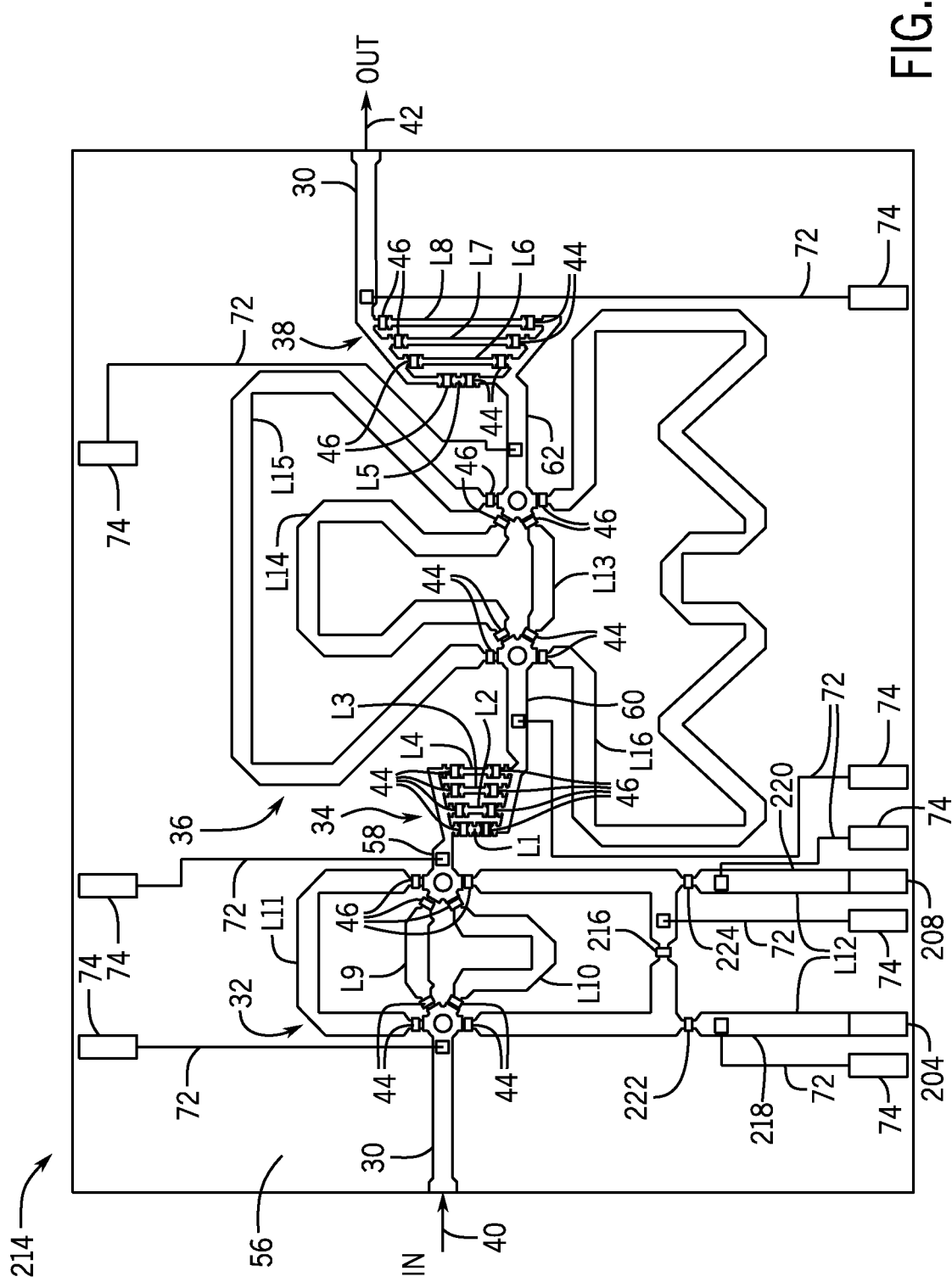
FIG. 6 is a schematic of a TTD module having a time delay line that is switchable between an on-chip path and an off-chip path, according to an alternative embodiment of the invention.

FIG. 6 shows a schematic of a TTD module 214 useable with beam former module 124, according to another embodiment of the invention. Components common to TTD module 214, TTD module 20 (FIG. 4), and TTD module 200 (FIG. 5) are referred to with common reference numbers as appropriate. TTD module 214 provides an alternative method of utilizing the off-chip lines in package base 138 of beam former module 124 of FIG. 3. Unlike TTD module 20 (FIG. 4) and TTD module 200 (FIG. 5), in which time delay lines L1-L16 have a predetermined, static time delay based on their on-chip or off-chip connections, the length of time delay line L12 in TTD module 214 may be selectively controlled, as described in detail below.

Time delay line L12 in TTD module 214 includes an intermediate switch 216 connecting a first on-chip portion 218 and a second-on-chip portion 220. First and second on-chip portions 218, 220 are also connected to bond pads 204, 208, to enable connection to a TTD meander line 198 in package base 138 in a similar manner described with respect to FIG. 5. Thus, assuming that switches 44, 46 corresponding to time delay line L12 are closed, a signal can travel time delay line L12 via two different paths: an off-chip path and an on-chip path. If intermediate switch 216 is open, the signal would travel from switch 44 to input feed path 204 via first on-chip portion 218, through a TTD meander line 198 in package base 138 to output feed path 208, and through second on-chip portion 220 to switch 46. However, if intermediate switch 216 is closed in addition to switches 44, 46, the signal would only travel along the shorter, on-chip signal path between switches 44, 46 and across intermediate switch 216.

TTD module 214 also includes additional intermediate switches 222, 224 within first and second on-chip portions to minimize resonance effects within the on-chip portions 218, 220 of time delay line L12. These intermediate switches 222, 224 are opened when intermediate switch 216 is closed by its gate driver 74 to define the on-chip signal transmission path. If the off-chip path is desired, intermediate switch 216 would be opened, and intermediate switches 222, 224 would be closed by their corresponding gate drivers 74.

Regardless of whether the one intermediate switch configuration or the optional three intermediate switch configuration is incorporated into in time delay line L12, time delay line L12 includes the option of a shorter on-chip signal transmission path and a longer off-chip signal transmission path. Accordingly, TTD module 214 provides a larger variety of time delay lines than TTD module 200 of FIG. 5 by incorporating both short and long time delay lines simultaneously. Thus, the greater variety of time delay lines provided by the on-chip and off-chip signal paths may allow TTD module 214 to be used in a wider variety of applications.

In some embodiments, TTD modules 20 (FIG. 4), 200 (FIG. 5), and 214 (FIG. 6) are provided with an optional lid or cap (not shown) that is be bonded to substrate 56 with an intervening layer of sealing material such as, for example, solder, glass frit, or gold. In that case, delay stages 32-38 and associated switching elements 44, 46 (and switching elements 216, 222, 224 in the case of TTD module 214) would be enclosed and vacuum or hermetically sealed within a cavity formed between the lid and substrate 56. The cavity may be filled with a dielectric medium such as, for example, but not limited to air or a dielectric gas such as nitrogen. TTD modules 20, 200, 214 may be packaged as individual modules corresponding to each antenna element 106 (FIG. 3) or as a wafer-level package including multiple TTD modules 20, 200, 214 sealed within a wafer-level cap.

Beneficially, embodiments of the invention thus provide a TTD beam forming system modules for broadband frequency signal processing applications. The beam forming system includes a plurality of beam former modules that have a variety of components integrated into a module structure. A beam former module includes a package base that has a plurality of TTD modules attached to an inner surface and electrically coupled to a plurality of antenna elements embedded in an outer surface. The package base further includes a signal combiner and a plurality of TTD meander lines integrated therein and coupled to the TTD modules in order to provide longer time delay lines for the TTD modules without the need for a monolithic TTD module or for connecting a next level assembly. The beam former module further includes a lid hermetically sealed to the package body and an HDI circuit attached to the lid and the package body for coupling digital components to the TTD modules and the signal combiner. Since the various elements of beam former module are integrated into the package base or onto the lid, the beam former module provides a modular structure that has a reduced size and includes consistent and reliable connections between the various integrated elements without the need for expensive cables. For example, the transmission lines 226 illustrated in FIG. 3 replace the numerous cable connections of prior art beam former configurations are used. Transmission lines 226 are shorter than prior art cable connections and have a fixed configuration, thereby significantly increasing reproducibility of the beam former module and thus reducing system calibration time.

Furthermore, an antenna array may be more easily formed in the beam forming system by simply adding the desired number of beam former modules to the beam forming system. This modular assembly of beam forming system 122 saves a significant amount of space over the typical arrangement of components in a beam forming system where each component is formed separately from each other component.

By integrating a portion of the longer time delay lines into the package base, the overall size and cost of the TTD module can be reduced. In addition, incorporating the antenna elements and various electrical lines into the package base decreases calibration time, variability, and costs by defining a predetermined and static distance between the antenna elements and electronic components. In addition, the modular structure of the beam former modules enable the size of the beam forming system to be scaled up or down in a straightforward manner.

According to one embodiment of the invention, a beam former module includes a package base and at least one TTD meander line and at least one RF signal transmission line encapsulated in the package base. In addition, the beam former module includes a first TTD module attached to the package base. The first TTD module includes a plurality of switching elements configured to define a signal transmission path between a signal input and a signal output of the first TTD module by selectively activating a plurality of time delay lines. At least one of the time delay lines of the first TTD module is electrically coupled to the at least one TTD meander line encapsulated in the package base. The signal input and the signal output of the first TTD module are electrically coupled to the at least one RF signal transmission line.

According to another embodiment of the invention, a method of manufacturing a beam former module includes encapsulating at least one time delay line and at least one RF signal transmission line in a package body and disposing at least one TTD module on a surface of the package body. The method also includes electrically coupling at least one time delay line in the at least one TTD module to the at least one time delay line in the package body and electrically coupling a signal input and a signal output of the at least one TTD to the at least one RF signal transmission line.

According to yet another embodiment of the invention, a TTD module includes an RF signal input, an RF signal output, a transmission line comprising a plurality of time delay lines defining signal paths of varying lengths, and a plurality of switching elements controllable to selectively activate the plurality of time delay lines to define a signal transmission path between the RF signal input and the RF signal output. The plurality of time delay lines includes at least one off-chip time delay line. The off-chip time delay line includes a first on-chip portion coupled between a first switching element of the plurality of switching elements and a first bond pad and a second on-chip portion coupled between a second switching element of the plurality of switching elements and a second bond pad.

According to still another embodiment of the invention, a TTD beam former module includes a package base having a plurality of insulating layers and an interconnect structure formed between and through the plurality of insulating layers. The TTD beam former module further includes a lid sealed to the package base and at least one TTD module positioned within a hermetic cavity formed between the lid and the package base and electrically coupled to the interconnect structure. Each TTD module includes a plurality of switches configured to selectively active a signal transmission line between a signal input of the TTD module and a signal output of the TTD module. The TTD beam former module additionally includes at least one antenna element attached to an outer layer of the package base. Each antenna element is electrically coupled to a respective TTD module of the at least one TTD module via the interconnect structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A beam former module comprising:
   a package base;
   at least one true time delay (TTD) meander line and at least one RF signal transmission line encapsulated in the package base; and
   a first TTD module attached to the package base and comprising a signal input, a signal output, a plurality of time delay lines, and a plurality of switching elements, the plurality of switching elements of the first TTD module configured to define a signal transmission path between the signal input and the signal output of the first TTD module by selectively activating the plurality of time delay lines of the first TTD module;
   wherein at least one time delay line of the first TTD module is electrically coupled to the at least one TTD meander line encapsulated in the package base; and
   wherein the signal input and the signal output of the first TTD module are electrically coupled to the at least one RF signal transmission line.

2. The beam former module of claim 1 further comprising a lid sealed to the package base; and
   wherein the first TTD module is positioned within a hermetic cavity formed between the package base and the lid.

3. The beam former module of claim 2 further comprising:
   a high density interconnect (HDI) circuit coupled to the lid; and
   a controller electrically coupled to the first TTD module via signal lines embedded in the HDI circuit and the package base.

4. The beam former module of claim 1 wherein the package base comprises an interconnect structure comprising a plurality of electrically conductive routing paths formed between and through a plurality of insulating layers.

5. The beam former module of claim 1 further comprising a second TTD module attached to the package base and comprising a signal input, a signal output, a plurality of time delay lines, and a plurality of switching elements, the plurality of switching elements of the second TTD module configured to couple the signal input of the second TTD module and the signal output of the second TTD module by selectively activating the plurality of time delay lines of the second TTD module;
   wherein at least one time delay line of the second TTD module is coupled to the at least one TTD meander line encapsulated in the package base.

6. The beam former module of claim 5 further comprising a signal combiner integrated in the package base and electrically coupled to each of the first and second TTD modules.

7. The beam former module of claim 1 further comprising an antenna element embedded in an exterior surface of the package base, the antenna element electrically coupled to the first TTD module via the RF transmission line.

8. The beam former module of claim 7 further comprising an amplifier attached to the package base and electrically coupling the first TTD module to the antenna element.

9. The beam former module of claim 1 wherein the package base is formed of at least one of a layer of ceramic and a layer of glass.

10. The beam former module of claim 1 wherein the at least one time delay line of the first TTD module electrically coupled to the at least one TTD meander line comprises:
    a first on-chip portion coupled between a first switching element of the plurality of switching elements and a first bond pad of the first TTD module; and
    a second on-chip portion coupled between a second switching element of the plurality of switching elements and a second bond pad of the first TTD module; and
    wherein the at least one TTD meander line is electrically coupled to the first bond pad and the second bond pad.

11. A method of manufacturing a beam former module comprising:
    encapsulating at least one time delay line and at least one RF signal transmission line in a package body;
    disposing at least one true time delay (TTD) module on a surface of the package body, the at least one TTD module having a plurality of time delay lines;
    electrically coupling at least one time delay line in the at least one TTD module to the at least one time delay line in the package body; and
    electrically coupling a signal input and a signal output of the at least one TTD module to the at least one RF signal transmission line.

12. The method of claim 11 further comprising coupling a lid to the package body to form a hermetically sealed cavity that houses the at least one TTD module.

13. The method of claim 11 further comprising embedding a first antenna element in an outer surface of the package body such that the first antenna element is electrically coupled to one of the signal input and the signal output of the at least one TTD module.

14. The method of claim 11 further comprising encapsulating a signal combiner in the package body, the signal combiner electrically coupled to one of the signal input and the signal output of the at least one TTD module.

15. The method of claim 11 further comprising:
attaching a high density interconnect (HDI) circuit to the package body; and
electrically coupling a controller to the at least one TTD module via electrical paths through the HDI circuit and the package body.

16. The method of claim 11 further comprising:
electrically coupling a first portion of the at least one time delay line in the at least one TTD module to a first end of a first time delay line in the package body; and
electrically coupling a second portion of the at least one time delay line in the at least one TTD module to a second end of the first time delay line in the package body.

17. A true time delay (TTD) module comprising:
an RF signal input;
an RF signal output;
a transmission line comprising a plurality of time delay lines defining signal paths of varying lengths; and
a plurality of switching elements controllable to selectively activate the plurality of time delay lines to define a signal transmission path between the RF signal input and the RF signal output;
wherein the plurality of time delay lines includes at least one off-chip time delay line comprising:
a first on-chip portion coupled between a first switching element of the plurality of switching elements and a first bond pad; and
a second on-chip portion coupled between a second switching element of the plurality of switching elements and a second bond pad.

18. The TTD module of claim 17 wherein the first and second bond pads comprise input/output connections configured for flip-chip solder attachment.

19. The TTD module of claim 17 wherein the at least one off-chip time delay line further comprises at least one intermediate switching element selectively controllable to couple the first switching element to the second switching element via an entirely on-chip signal transmission path or via a partially off-chip signal transmission path.

20. The TTD module of claim 17 further comprising a plurality of delay stages each comprising a subset of the plurality of time delay lines;
wherein at least one delay stage comprises at least one off-chip time delay line and at least one on-chip time delay line.

21. A beam former module comprising:
a package base comprising:
a plurality of insulating layers; and
an interconnect structure formed between and through the plurality of insulating layers;
a lid sealed to the package base;
at least one true time delay (TTD) module positioned within a hermetic cavity formed between the lid and the package base and electrically coupled to the interconnect structure, the at least one TTD module comprising a plurality of switches configured to selectively activate a signal transmission line between a signal input of the at least one TTD module and a signal output of the at least one TTD module; and
at least one antenna element attached to an outer layer of the package base, the at least one antenna element electrically coupled to a respective TTD module of the at least one TTD module via the interconnect structure.

22. The beam former module of claim 21 wherein the at least one TTD module is a lidless TTD module.

23. The beam former module of claim 21 further comprising:
a high density interconnect (HDI) circuit attached to at least one of the lid and the package base and electrically coupled to the at least one TTD module by way of the interconnect structure; and
a controller electrically coupled to the at least one TTD module through the HDI circuit and the interconnect structure, the controller configured to control the plurality of switches of the at least one TTD module.

24. The beam former module of claim 21 wherein the interconnect structure comprises a stripline signal combiner that is electrically coupled to the at least one TTD module.

25. The beam former module of claim 21 further comprising an amplifier disposed within the hermetic cavity and electrically coupled to the at least one TTD module through the interconnect structure.

* * * * *